(12) United States Patent
Söderström et al.

(10) Patent No.: US 11,826,680 B2
(45) Date of Patent: Nov. 28, 2023

(54) OIL FILTER

(71) Applicant: Volvo Car Corporation, Gothenburg (SE)

(72) Inventors: Thomas Söderström, Älvsjö (SE); Jonatan Ekstrand, Åsa (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/693,678

(22) Filed: Mar. 14, 2022

(65) Prior Publication Data

US 2022/0203275 A1   Jun. 30, 2022

Related U.S. Application Data

(62) Division of application No. 16/598,270, filed on Oct. 10, 2019, now Pat. No. 11,305,218.

(30) Foreign Application Priority Data

Oct. 23, 2018   (EP) .................................... 18201930
Sep. 30, 2019   (EP) .................................... 19200521

(51) Int. Cl.
B01D 29/96        (2006.01)
B01D 35/00        (2006.01)
(Continued)

(52) U.S. Cl.
CPC ........... B01D 29/96 (2013.01); B01D 35/005 (2013.01); B01D 35/147 (2013.01); B01D 35/30 (2013.01);
(Continued)

(58) Field of Classification Search
CPC .. F01M 11/03; F01M 2011/031; B01D 29/96; B01D 35/005; B01D 35/147;
(Continued)

(56) References Cited

U.S. PATENT DOCUMENTS 5,643,448 A   7/1997   Martin et al.
6,146,527 A   11/2000  Oelschlaegel
(Continued)

FOREIGN PATENT DOCUMENTS

CN   101119784 A   2/2008
CN   102448575 A   5/2012
(Continued)

OTHER PUBLICATIONS

Mar. 14, 2019 European Search Report issue on International Application No. EP18201930.
(Continued)

*Primary Examiner* — Liam Royce
(74) *Attorney, Agent, or Firm* — Clements Bernard Walker; Christopher L. Bernard (57) ABSTRACT

The present invention relates to a filter element comprising an oil filter port adapted to be in fluid communication with an oil port of an engine the oil filter port includes threads for attaching the filter element in the oil port of the engine. Thus, the inventors realized that by providing the oil port with threads, the oil port of the filter element may be tightened in the oil port of the engine to in this way ensure axial locking of the filter element in the engine. The present invention also relation to a corresponding filter housing.

12 Claims, 11 Drawing Sheets

(51) Int. Cl.
    *B01D 35/30*     (2006.01)
    *B01D 35/147*     (2006.01)

(52) U.S. Cl.
    CPC .. *B01D 2201/291* (2013.01); *B01D 2201/305* (2013.01); *B01D 2201/4015* (2013.01); *B01D 2201/4053* (2013.01); *B01D 2201/4076* (2013.01); *B01D 2201/4092* (2013.01)

(58) Field of Classification Search
    CPC .............. B01D 35/30; B01D 2201/291; B01D 2201/305; B01D 2201/4053; B01D 2201/4076; B01D 2201/4092; B01D 2201/0415; B01D 2201/295; B01D 2201/4007; B01D 2201/4015; B01D 29/21
    See application file for complete search history.

(56) References Cited

U.S. PATENT DOCUMENTS

| | | | |
|---|---|---|---|
| 6,387,259 | B1 | 5/2002 | Roll |
| 6,554,139 | B1 | 4/2003 | Maxwell et al. |
| 8,858,793 | B2 | 10/2014 | Roesgen |
| 2002/0043506 | A1 | 4/2002 | Amstutz et al. |
| 2003/0132158 | A1 | 7/2003 | Clausen et al. |
| 2004/0232064 | A1 | 11/2004 | Wilkinson et al. |
| 2006/0186031 | A1 | 8/2006 | Fick et al. |
| 2007/0158263 | A1 | 7/2007 | Brandt et al. |
| 2007/0241040 | A1 | 10/2007 | Kott et al. |
| 2013/0075319 | A1 | 3/2013 | Roesgen |
| 2015/0273365 | A1 | 10/2015 | Laverdiere et al. |
| 2017/0361252 | A1 | 12/2017 | Vogt et al. |

FOREIGN PATENT DOCUMENTS

| | | | | |
|---|---|---|---|---|
| CN | 104822438 | A | | 8/2015 |
| CN | 105041521 | A | | 11/2015 |
| CN | 206290301 | U | | 6/2017 |
| CN | 108136296 | A | | 6/2018 |
| DE | 102015208426 | A1 | | 11/2016 |
| DE | 102015007182 | A1 | | 12/2016 |
| EP | 0783913 | A1 | | 7/1997 |
| JP | 10685007 | U | | 12/1994 |
| KR | 20090012184 | U | | 12/2009 |
| WO | 2014203377 | A1 | | 12/2014 |
| WO | WO-2017050368 | A1 | * | 3/2017 ............. B01D 29/21 |

OTHER PUBLICATIONS

Feb. 6, 2020 European Search Report issue on International Application No. EP19200521.

Office action and search report issued in the corresponding CN application No. 201910999225.5.

U.S. Office Action and cited documents from Examiner in corresponding U.S. Appl. No. 16/658,216.

* cited by examiner

OIL FILTER

CROSS-REFERENCE TO RELATED APPLICATIONS

The present disclosure is a divisional (DIV) of co-pending U.S. patent application Ser. No. 16/598,270, filed on Oct. 10, 2019, which claims the benefit of priority of co-pending European Patent Application No. 18201930.7, filed on Oct. 23, 2018, and European Patent Application No. 19200521.3, filed on Sep. 30, 2019, the contents of all of which are incorporated in full by reference herein.

TECHNICAL FIELD

The present invention relates to a filter element for an oil filter configured to be releasably lockable in a filter housing. The present invention also relates to a filter housing for accommodating a filter element.

BACKGROUND

Oil filters for vehicles are used for filtering oil being circulated through engine parts or other part of the vehicle that require lubrication. The oil filter inevitably becomes clogged with contaminants from e.g. the engine and is therefore subjected to periodic replacement.

An oil filter for an engine typically comprises a filter cartridge holding a filter material such as paper filter. The filter cartridge is mounted in a permanent filter casing which is mounted on the engine. The filter cartridge comprising the filter material is replaceable when the filter material is clogged or during an oil change for the engine.

The filter cartridge is often locked in the filter casing with clips. Further, the filter cartridge inlet port is pushed into an engine oil port and is held in place by an O-ring that is compressed by being forced into the engine oil port. However, it is desirable to provide a more robust connection between filter cartridges and their filter casing.

SUMMARY

In view of above-mentioned prior art, the inventors have realized that the prior art oil filters for engines suffer from that the connection between the filter element and the engine cannot in an efficient way withstand axial forces, thereby, in at least some cases, it may be difficult to maintain the filter element axially in place in the engine oil port. It is therefore an object of the present invention to provide an improved filter element which provides for axially locking of the filter element in the engine oil port.

The above objective is at least partly accomplished by a filter element comprising an oil filter port adapted to be in fluid communication with an oil port of an engine, the filter oil port includes threads for attaching the filter element in the oil port of the engine. Thus, the inventors realized that by providing the oil port of the filter element with threads, the oil port of the filter element may be tightened in the oil port of the engine to in this way ensure axial locking of the filter element in the engine.

Further, the filter element includes a locking mechanism for locking the filter element in the filter housing that includes matching locking mechanism. In this way, the filter element may be attached and locked in the filter housing before it is screwed into the engine via its threaded oil port.

According to a first aspect of the invention, there is provided a filter element for an oil filter, configured to be releasably lockable in a filter housing comprising a locking mechanism. The filter element comprises a filter medium adapted to capture contaminants in oil passing through the filter medium. Further, an oil filter port is adapted to be in fluid communication with an oil port of an engine, the oil filter port is arranged on one distal end of the filter element, and the oil filter port includes threads for attaching the filter element in the oil port of the engine. Further, the filter element comprises a locking mechanism for locking the filter element in place in the filter housing.

It is often the case that the filter housing is attached to the engine at the engine oil port via threads on the filter housing and matching receiving thread in the engine. Accordingly, in one embodiment, the lead of the threads in the oil port of the filter element are substantially equal to the lead of threads on the filter housing adapted for attaching the filter housing to the engine.

In one embodiment, the threads of the oil port of the filter element are a multi start thread. Accordingly, the risk of tightening the filter element oil port incorrectly into the engine oil port, and thereby risk leakage, is reduced. Another advantage of a multi-start thread is that it seals better than a traditional single start thread.

According to a second aspect of the invention, there is provided a filter housing for accommodating a filter element. The filter housing comprises a side wall connected with a bottom part defining a housing volume configured to hold oil and to accommodate the filter element. Further a locking mechanism is configured to releasably lock the filter element in place. In addition, the filter housing comprises a thread adapted for attaching the filter housing to the engine, wherein the thread has substantially the same lead as threads of an oil portion of the filter element.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing example embodiments of the invention, wherein.

DESCRIPTION OF EMBODIMENTS

In the present detailed description, various embodiments of the filter element and the filter housing according to present invention are described. However, this invention may be embodied in many different forms and should not be construed as limited to the embodiments set forth herein; rather, these embodiments are provided for thoroughness and completeness, and fully convey the scope of the invention to the skilled person. Like reference characters refer to like elements throughout.

Figure 1:
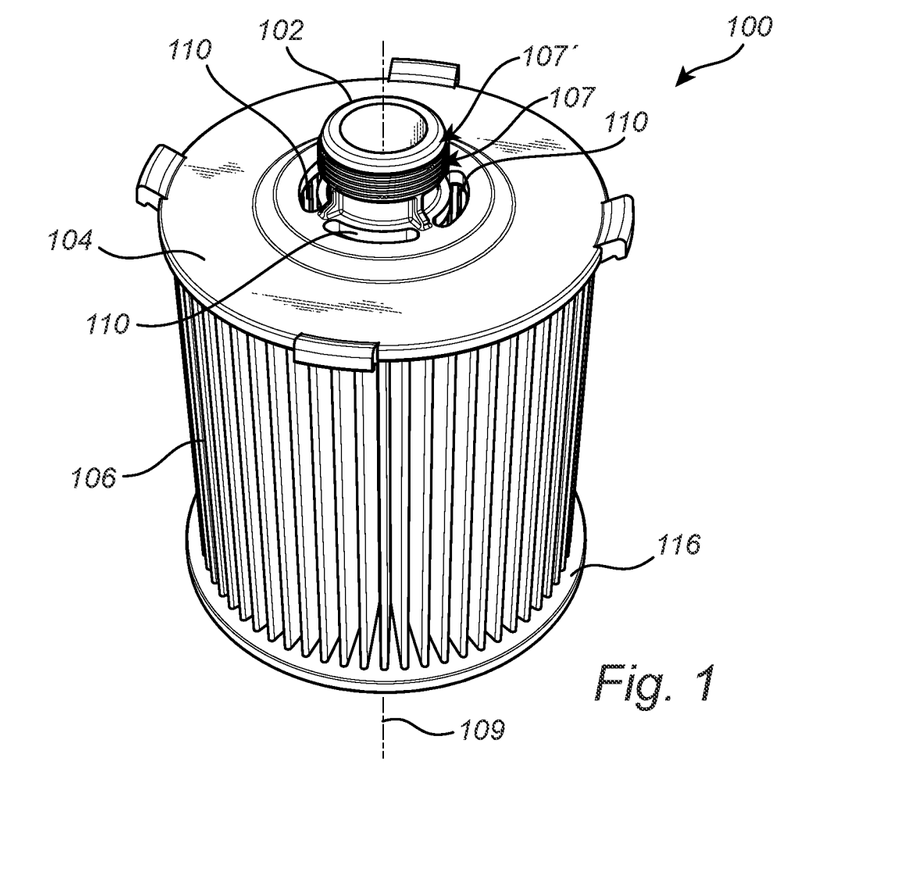
FIG. 1 illustrates an example filter element according to embodiments of the invention.

FIG. 1 is a perspective view of a filter element according to embodiments of the present disclosure. The filter element 100 comprises an oil filter port 102 adapted to be in fluid communication with an oil port of an engine. The oil filter port 102 is arranged one distal end of the filter element 100. Oil that has been filtered through the filter element is returned to the engine via the oil filter port 102. In other words, the oil filter ports may be an oil outlet filter port. The oil filter port 102 is here shown arranged in an upper end plate 104 on one distal end of the filter element 100.

The filter element 100 further comprises a filter medium 106 mechanically connected to the upper end plate 104. The filter medium 106 is configured to capture contaminants in the circulated oil when the filter element is in use. Such filter mediums are per se known to the skilled person.

Further, the oil filter port 102 includes threads 107 for attaching the filter element in the oil port of the engine. With the threaded oil filter port of the filter element, the O-ring often used in prior art oil filters may be omitted, thereby providing a connection with fewer part and therefore reduced cost. Further the threaded oil filter port 102 provides for a secure attachment of the filter element in the oil port of the engine.

Figure 2A:
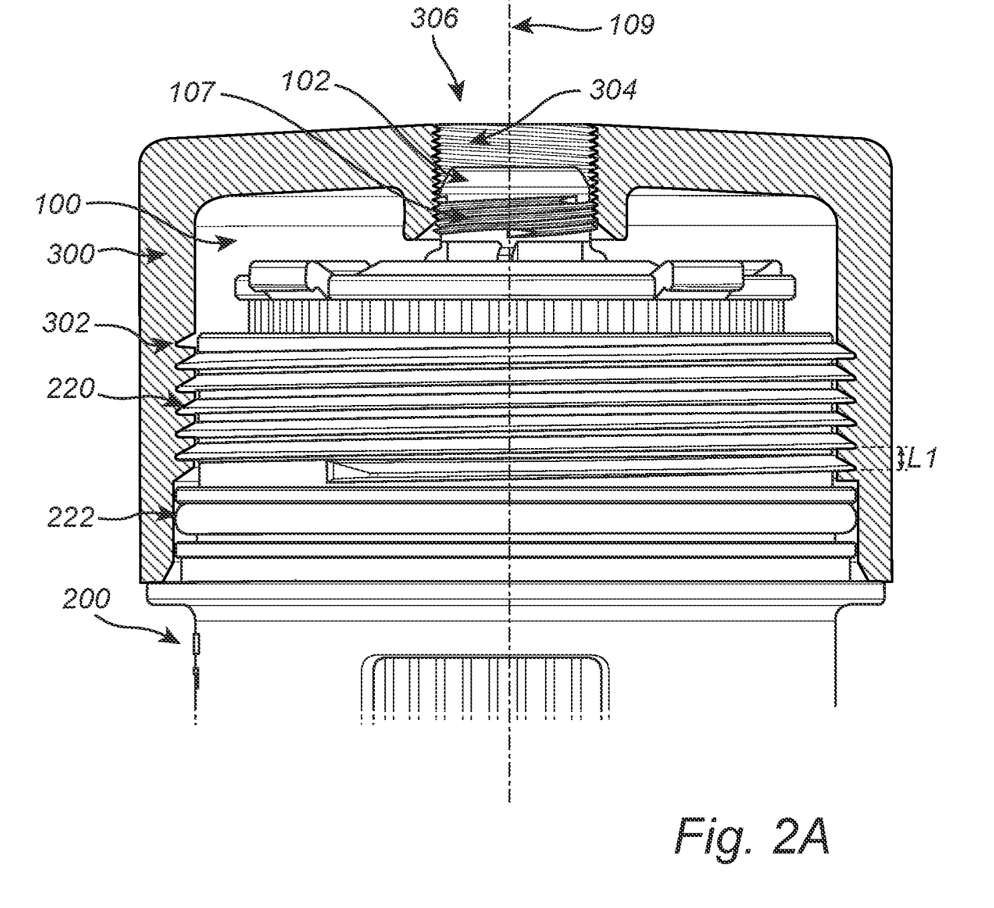
FIG. 2A illustrates an example filter element and partial filter housing when attached to the oil sump of an engine according to embodiments of the invention.

FIG. 2A conceptually illustrates a filter element 100 arranged in place in a filter housing 200. The filter housing 200 includes threads 220 for attaching the housing 200 to a vehicle engine e.g. at an oil sump or in an engine block depending on the specific implementation. Here, the numeration 300 denotes an oil sump 300, but may equally well represent an engine block. Optionally an O-ring 222 arranged to seal the connection between the filter housing 200 and the oil sump 300. The oil sump 300 includes matching threads 302 for the filter housing threads 220, and matching threads 304 in the engine oil port 306 for engaging with the threads 107 of the filter element oil port 102. The threads 107 of the oil port 102 are outer threads, e.g. male threads, on the oil port 102, formed on the outer surface of the cylindrical oil port 102, that are configured to engage with inner threads 304, e.g. female threads, of the engine oil port 306, i.e. provided as a threaded hole.

The filter housing 200 should be threaded into the receiving threads 302 at the same time as that the filter element oil port 102 is threaded into the engine oil port 306. In order to facilitate the connecting and to ensure that there is no substantial leakage from the engine oil port 306, the lead, see FIG. 3A, of the threads in the oil port 102 of the filter element 100 are substantially equal to the lead L1 of threads 220 on the filter housing 200 adapted for attaching the filter housing 200 to the engine 300. The lead of a thread is understood to be the axial advance of the threaded element during a complete turn of the element. In other words, if the filter housing and the filter element is simultaneously screwed into the engine oil sump, they move axially at substantially the same pace such that no or little strains in the thread connections are created.

Figure 2B:
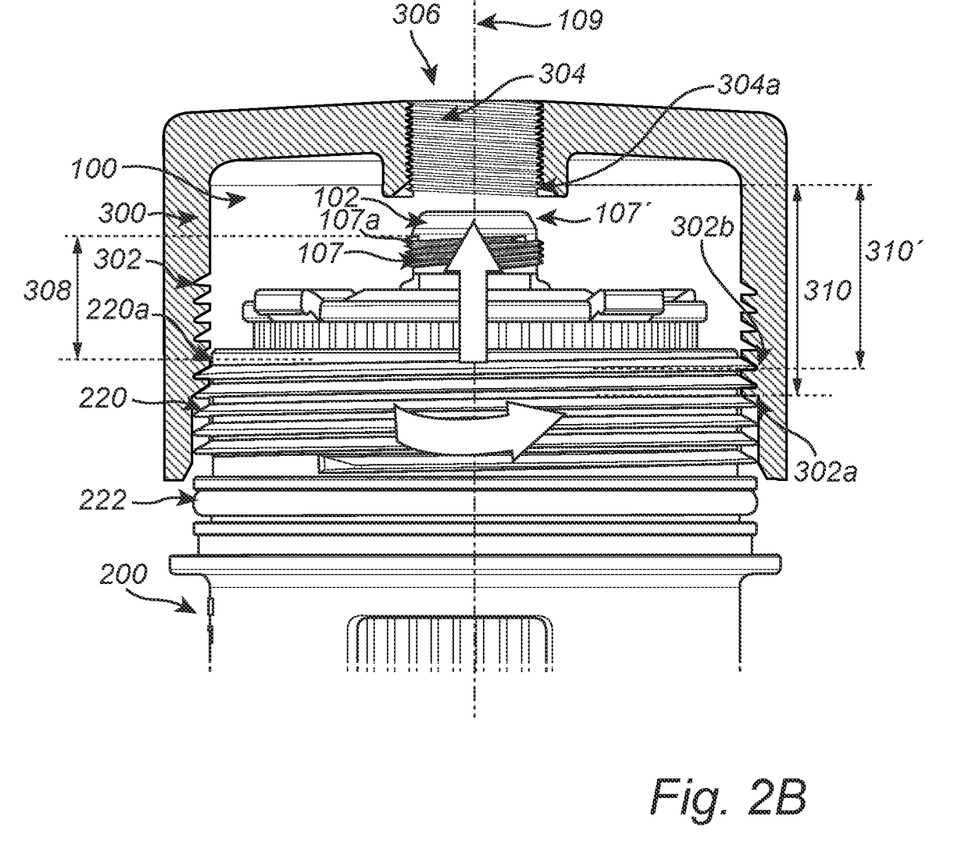
FIG. 2B illustrates an example filter element and partial filter housing when being attached to the engine according to embodiments of the invention.

FIG. 2B illustrates the filter element 100 in its filter housing 200 as it is about to be mounted in the oil sump 300 of the engine. As shown, the threads 220 of the filter housing engages the threads 302 of the oil sump 300 before the threads 107 on the oil port 102 of the filter element 100 has reached the threads 304 in the oil port 306 of the engine oil sump 300. For this, the distance 308 between the uppermost portion 220a of the threads 220 of the filter housing 200 and the uppermost portion 107a of the threads 107 on the oil port 102 is smaller than the distance 310 between the entry 302a of the threads 302 in the oil sump 300 and the entry 304a of the threads 304 in the oil port 306 of the oil sump 300. In order to facilitate the guiding of the oil port 102 in to the engine oil port 306, the oil port 102 of the filter element 100 includes a non-threaded upper portion 107' adjacent to the threads 107.

Preferably, the distance 308 between the uppermost portion 220a of the threads 220 of the filter housing 200 and the uppermost portion 107a of the threads 107 on the oil port 102 is smaller than the distance 310', between the second turn 302b of the threads 302 in the oil sump 300 and the entry 304a of the threads 304 in the oil port 306. In this way, it can be ensured that the filer housing 200 engages with the threads 302 before the oil port 107 engages with the threads 304 in the engine oil port 306 which improves the guiding of the filter element oil port 102 into the engine oil port 306.

The non-threaded upper portion 107' preferably having an inclined surface, e.g. forming an at least partly conical shape. Preferably, the filter element 100 is concentric with the oil port 306 of the oil sump 300, as well as with the threads 302 of the filter element oil sump 302 with which the filter housing 200 engages.

Figure 3A:
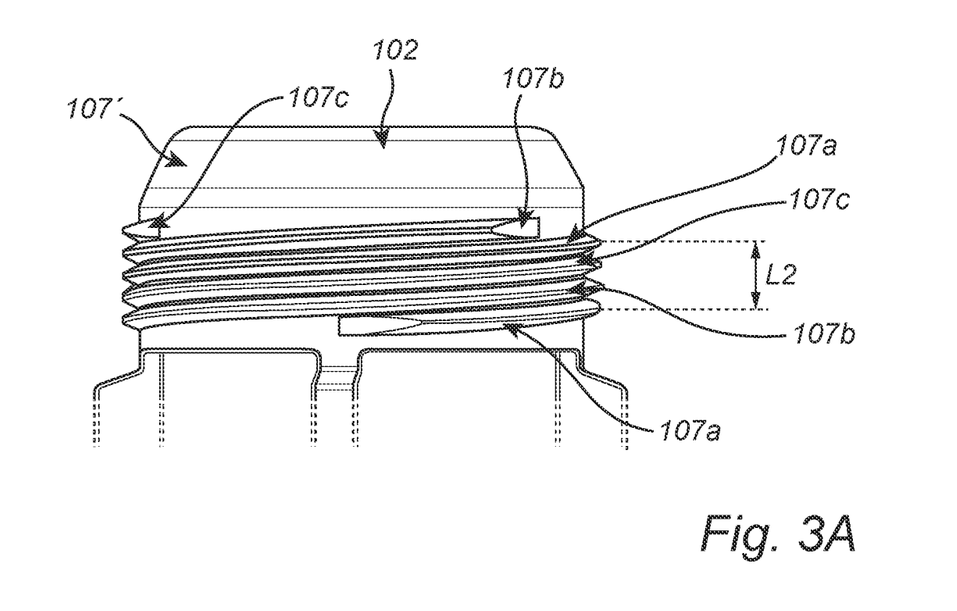
FIG. 3A illustrates an example oil port of a filter element according to embodiments of the invention.
Figure 3B:
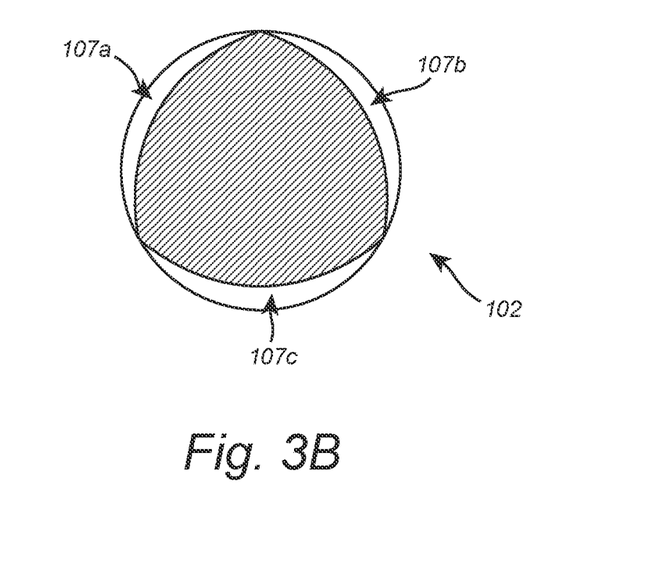
FIG. 3B is a cross-section of an example multi start thread.

FIG. 3A illustrates an example oil port 102 of the filter element 100. In this embodiment, the threads 107 of the oil port of the filter element are a multi start thread. The threads 107 include several interleaved threads running in parallel, here the threads 107 include a first thread 107a, a second thread 107b, and a third thread 107c each having their own start and end. Here, in FIG. 3A is the start of thread 107a shown, and the ends of threads 107c and 107b. FIG. 3B illustrates a conceptual cross-sectional view of the multi start thread 107, showing starts of threads 107a, 107b, and 107c, in the cross-section. The axis 109 is perpendicular to the axis of the cross-section plane.

With a multi start thread 107a-c on the oil port 102 of the filter element 100, it is ensured that when the filter housing 200 is secured in the engine 300 with the threads 220 engaged with the threads 302, the oil port 102 threads 107 will enter the matching threads of the engine oil port 306 while the housing has not been rotated a full turn. For example, with the three threads 107a-c having their starts equally distributed around the periphery of the cylindrical oil port 102, the filter housing 200 only need to be rotated one third of a full turn before one of the threads 107a-c of the oil port 102 is engaged with the threads 304 of the engine oil port 306, provided as a threaded hole. Accordingly, the risk of tightening the filter element oil port incorrectly into the engine oil port, and thereby risk leakage, is reduced. Another advantage of a multi-start thread is that it seals better than a traditional thread. L2 is the lead of the thread 107, i.e. the lead is the distance between adjacent turns of one of the threads, here thread 107a, in a multi-start thread.

The number threads in a multi start thread for the oil port 102 may be other than the depicted herein. For example, the number of intertwined threads may be two, three, four, five, six.

The filter element 100 is a cylindrical filter element, and the filter port 102 is also cylindrically shaped. The threads 304 of the filter housing 200 are provided on a cylindrical portion of the filter housing 200. Further the threads 107 of the filter element oil port are concentrically oriented with the threads 302 on the filter housing 200, when the filter element is mounted in the filter housing, as illustrated in FIG. 2. Accordingly, the threads 107 of the oil port 102 share the same center axis as the threads 302 of the filter housing 200.

Figure 4:
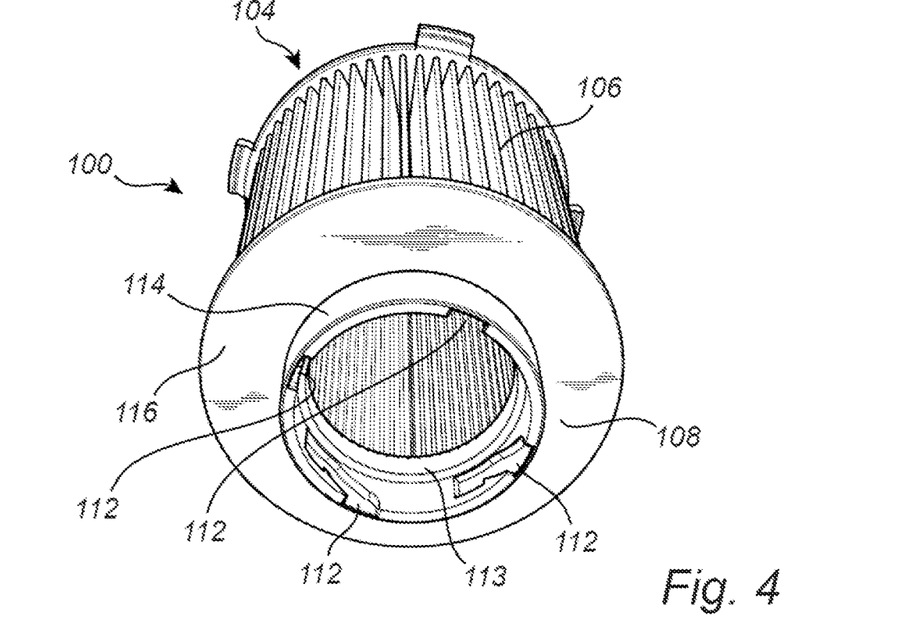
FIG. 4 illustrates an example filter element according to embodiments of the invention.

As is more clearly seen in FIG. 4, the filter element 100 comprises a locking mechanism 108 arranged on the other distal end of the filter element 100. The locking mechanism 108 is arranged on the opposite side of the filter medium 106 with respect to the upper end plate 104. The locking mechanism 108 of the filter element 100 is adapted to prevent rotation of the filter element 100 in the filter housing 200. It is advantageous to prevent rotation of the filter element 100 in the filter housing 200 in order to facilitate the securing of the filter element 100 oil port 102 in the engine oil port 306 via the threads 107, 304. With reference to FIG. 2, when the filter housing 200 is rotated for securing it in the engine 300 via the threads 220 and 302, the oil port 102 of the filter element 100 is simultaneously secured in the engine oil port 306 via the threads 107, 304, as a result of the filter housing 200 being rotated, provided that the filter element 100 is not rotating with respect to the filter housing 200 about the axis 109. Accordingly, ensuring that the filter element 200 is rotationally locked in the filter housing 200 facilitates the mounting of the filter element 100 oil port 102 in the engine oil port 306.

Turning again to FIG. 4, in this embodiment, the locking mechanism 108 is a circumferential locking mechanism arranged on the other distal end of the filter element, on an opposite side of the filter medium 106. The circumferential locking mechanism is circular, e.g. here arranged on a cylindrical flange 114.

As will be described in more detail below, the locking mechanism 108 is configured to cooperate with a filter housing locking mechanism to lock the filter element 100 in place in the filter housing. This is accomplished by a rotational motion of the filter element 100 with respect to the filter housing while applying an axial force for pushing the filter element 100 into the filter housing.

Accordingly, with the inventive concept, the filter element 100 can be removed from, or secured in, the associated filter housing by a simple and fast combined rotational and pushing motion without the need for invasive actions on the filter element. Thus, the locking mechanism provides for ensuring that the filter element 100 is rotationally locked, e.g. prevented from rotating about the axis 109, and for a simple removal of the filter element from the filter housing and a simple insertion and securement of the filter element in the filter housing compared to the clips often used in prior art filters.

Figure 5:
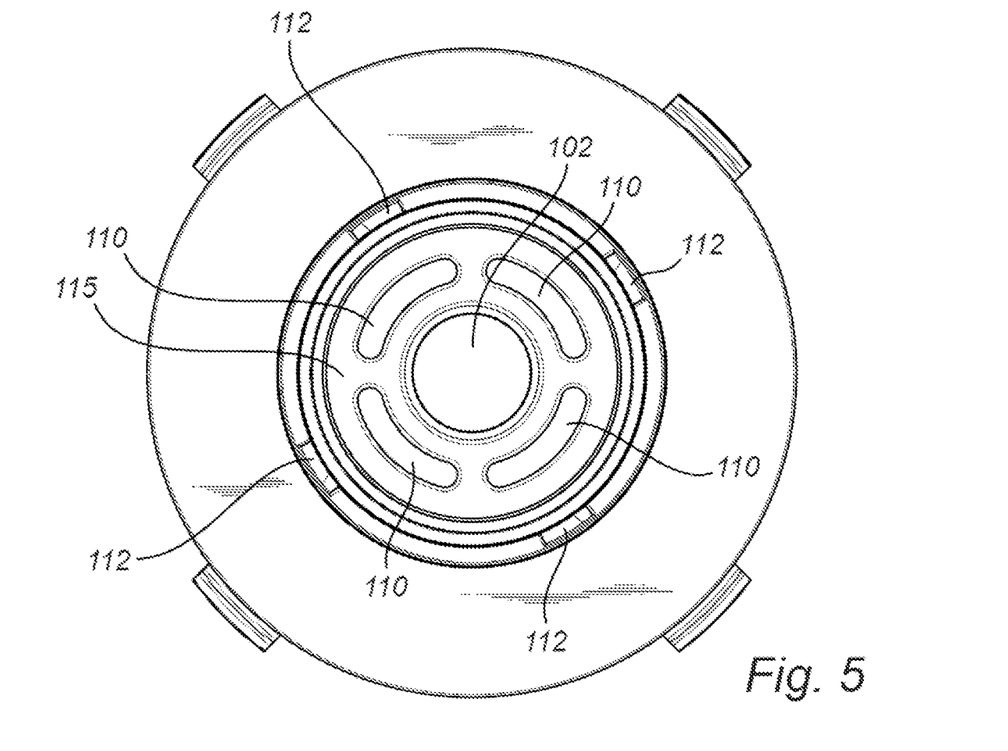
FIG. 5 illustrates an example filter element according to embodiments of the invention.

For securing of the filter element 100 in the filter housing 200, the filter element 100 comprises a receiving surface 115, best seen in FIG. 5, adapted for receiving a counter-force from the filter housing when the axial force is applied. The distance between the receiving surface 115 and the locking mechanism 108 of the filter element is adapted such that the filter element 100 is configured to latch into a locked position in the filter housing under the influence of the counter-force.

Accordingly, the present invention advantageously provides the circumferential locking mechanism on one side of the filter element which latches into a locked position by a combined rotational and pushing motion into the filter housing. The counter-force provided by the filter housing serves to securely lock the filter element in the filter housing by means of their cooperating circumferential locking mechanisms.

The receiving surface 115 is here shown to be comprised in the upper end plate 104. More precisely, the receiving surface 115 is here on the opposite side of the upper end plate 104 with respect to the side comprising the oil filter port 102, although other possible receiving surfaces are conceivable. However, having the receiving surface on side of the upper end plate 104 facing the filter medium advantageously provides for a counter force to be applied on a surface often already existing in present oil filter designs. Thus, no need for re-designing the upper end plate 104 is in such case necessary.

The axial dimension of the filter element is along the axis 109 along a longitudinal extension of the filter element 100.

The upper end plate 104 comprising the oil filter port 102 is here shown to further comprise bypass valve through-holes 110 adjacent to the oil filter port 102. The bypass valve through-holes 110 serve to allow oil to bypass the filter medium 106 in case of a high pressure drop over the filter element 100. In such case, a bypass valve spring is compressed such that the bypass valve through-holes 110 are opened and the oil passes unfiltered directly from the bypass valve through-holes 110 to the oil filter port 102.

In some embodiments, the counter-force applied on the receiving surface 115 is applied by the bypass valve spring. Thus, the receiving surface 115 may comprise the bypass valve through-holes 110. In this way, the bypass spring which is used for operating the bypass functionality may serve to also provide the counter-force. Thus, there is no need for additional devices for providing the counter-force since the bypass spring is already used in present filter designs.

As shown in FIG. 4, the locking mechanism 108 of the filter element 100 may comprise at least one locking member 112. The locking member 112 is configured to latch onto matching locking members of the filter housing. In other words, dedicated locking members 112 on the filter element 100 are adapted to latch onto dedicated locking members of the filter housing to provide a strong latching mechanism.

The locking mechanism 108 of the filter element may comprise at least two locking members 112. In the presently illustrated example embodiment, the locking mechanism 108 of the filter element 100 comprises four locking members 112. Thereby, the rigidity of the locking mechanism 108 is improved.

The locking mechanism 108 of the filter element 100 may comprise a circumferential flange 114 extending in an axial direction i.e. along the axis 109. The circumferential flange 114 is attached to the lower end plate 116 which is mechanically connected to the filter medium 106. The locking members 112 are comprised in the circumferential flange 114. The upper end plate 104 and the lower end plate 116 are preferably concentrically arranged on the axis 109. The circumferential flange 114 enables a preferable position for the locking members 112. The circumferential flange 114 is here shown concentrically arranged with the lower end plate 116 on the axis 109, although this is not strictly required.

As is illustrated in FIGS. 4 and 5, the locking members 112 may be equally circumferentially distributed on the circumferential flange 114. This advantageously allows for a random rotational orientation of the locking mechanism 108 of the filter element 100 with respect to the locking mechanism of the filter housing prior to locking the filter element 100 to the filter housing. Thus, this allows for rotational symmetry of the locking mechanism 108 of the filter element 100 with respect to the axis 109 and with respect to the locking mechanism of the filter housing.

In other words, a user does not have to visually inspect that the rotational orientation of the filter element is correctly aligned with the filter housing before attempting to lock it to the filter housing.

Figure 6:
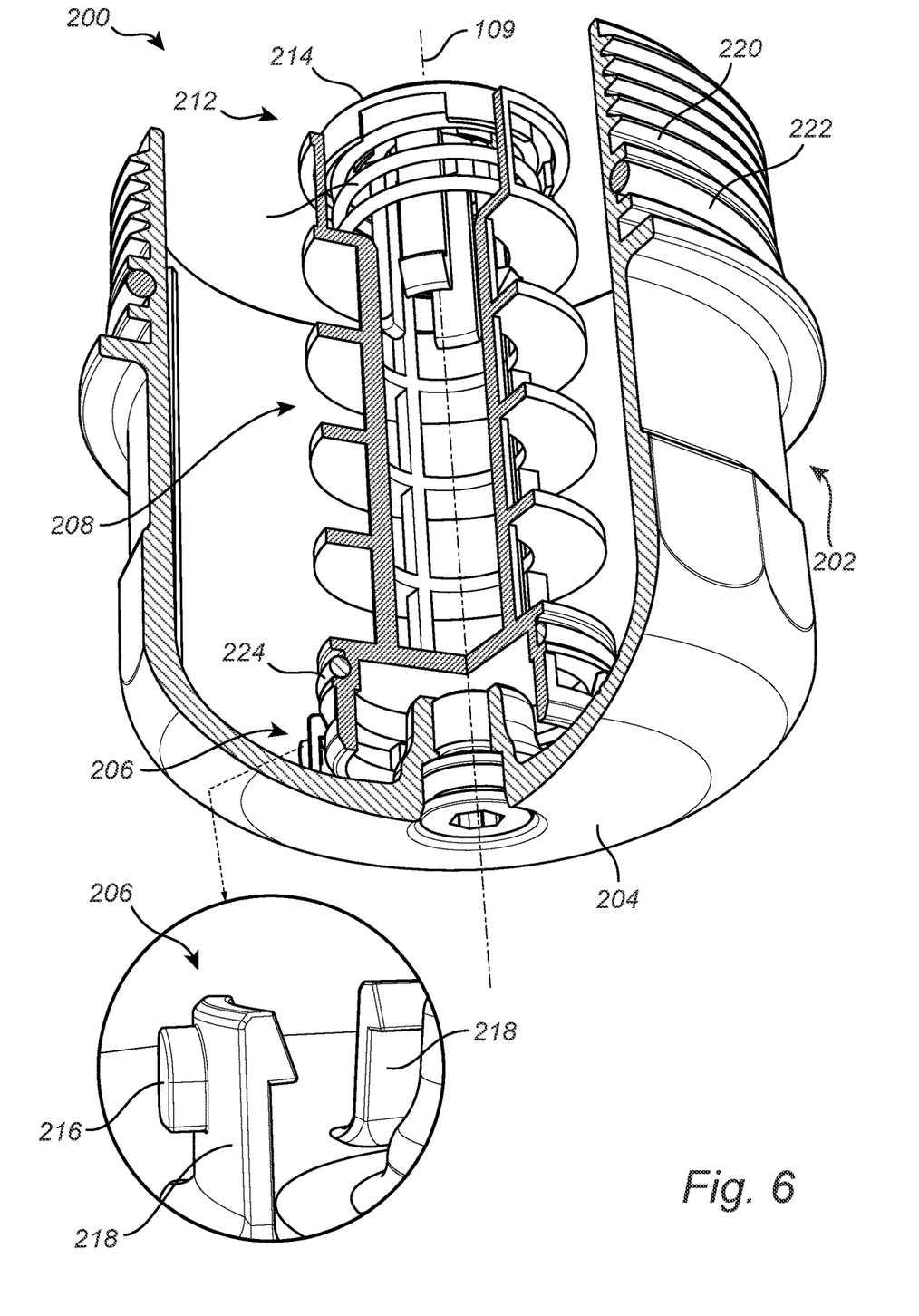
FIG. 6 illustrates an example filter housing according to embodiments of the invention.

Now turning to FIG. 6 which illustrates a filter housing 200 for accommodating a filter element, e.g. as shown in FIGS. 1-5.

The filter housing 200 comprises a side wall 202 connected with a bottom part 204 defining a housing volume configured to hold oil and to accommodate the filter element. The side wall 202 is preferably cylindrically shaped as in the depicted example embodiment.

A locking mechanism 206 is configured releasably lock the filter element in place. The locking mechanism 206 is here arranged at the bottom part 204 of the filter housing 204, such that when the filter element 100 is arranged in the filter housing 200, the locking mechanism 108 of the filter element 100 reaches the locking mechanism 206 of the filter housing 200. The locking mechanism may be a circumferential locking mechanism, arranged along a circular path. The filter housing 200 comprises a thread 220 adapted for attaching the filter housing 200 to the engine, wherein the thread has substantially the same lead as threads of an oil port of the filter element.

A supporting element 208 is arranged to support a counter-force device 210 at the distal end 212 of the filter housing opposite from the bottom part 204. The supporting element 208 may be comprised of a cage structure or a "skeleton" in which the counter-force device 210 is arranged. Accordingly, the supporting element 208 is configured to allow oil to pass into its center and flow there-through, along the axis 109 towards the oil filter outlet port of the filter element. The counter-force device 210 is configured to provide a counter-force on a receiving surface 115 of the filter element 100.

The filter housing locking mechanism 206 is configured to cooperate with the filter element locking mechanism 108 to lock the filter element 100 in place by a rotational motion of the filter element 100 with respect to the filter housing 200 while applying an axial force for pushing the filter element 100 into the filter housing 200 to thereby overcome the counter-force applied by the counter-force device 210. The filter element 100 is configured to latch into a locked position in the filter housing 200. Preferably, the filter element 100 is rotationally locked in the filter housing 200.

Accordingly, the filter housing 200 comprises a locking mechanism which is able to cooperate with the locking mechanism of the filter element such that the filter element and the filter housing may be latched into a locked position.

In some embodiments, including the presently discussed embodiment is the counter-force device a bypass valve spring 210, although other counter-force device are conceivable.

The bypass spring 210 is configured to push a bypass valve gasket 214 towards the bypass through-holes 110 in the filter element 100 (see FIGS. 1 and 5) such that the bypass through-holes 110 are sealed. Using the bypass spring 210 as the counter-force device reduces the need for introducing further components in the filter housing. Thus, the already existing bypass spring 210 may advantageously be used as the counter-force device.

As illustrated in FIG. 6, the locking mechanism 206 of the filter housing comprises at least one locking member 216 configured to latch onto matching locking members of the filter element. The locking of the filter housing with the filter element will be described with reference to subsequent drawings.

The locking mechanism 206 of the filter housing comprises at least two locking members 216 circumferentially arranged with respect to each other. The locking mechanism 206 of the filter housing comprises an equal number of locking members 216 as the number of locking members of the filter element. For example, the filter element 100 depicted in FIGS. 1-5 comprises four locking members 112. Thus, in this case, the filter housing preferably also comprises four locking members 206.

The locking members 216 of the filter housing may be equally circumferentially distributed on flanges 218 extending in an axial direction from the bottom part. Each of the locking members 216 of the filter housing may be arranged on a respective individual flange 218, although other options are also conceivable.

Here, the locking members 218 of the filter housing 200 are illustrated as radial locking pin members 218. That the pin members are radial means that they protrude from the surface of the flange 218 in a radial direction of the filter housing, orthogonally with respect to the longitudinal axis 109.

The filter housing 200 here further comprises threads 220 for attaching the housing to a vehicle engine, and optionally an O-ring 222 arranged to seal the connection between the filter housing 200 and the vehicle engine.

Furthermore, an O-ring 224 is optionally arranged near the locking mechanism 206 and is arranged to seal the connection between the bottom-most portion of the supporting element 208 and the filter element such that oil may not bypass the filter medium through the bottom opening of the filter element.

The O-ring 224 is configured to seal against the circumferential surface 113 of the filter element, best seen in FIG. 4. The circumferential surface 113 is arranged adjacent to and axially displaced from the locking members 112. The circumferential surface 113 is preferably inclined in the axial direction 109 of the filter element 100, with the larger diameter closest to the locking members 112. This provides an additional force for maintaining the filter element locked in the filter housing since the interaction between the inclined circumferential surface 113 and the O-ring 224 attempts to move the filter element upwards, i.e. it enhances the motion of the filter element 100 in the direction indicated by the arrow 506 in FIG. 7D.

The O-ring 224 which is arranged adjacent to the locking mechanism 206 may further serve to provide a counter-force for pushing the radial locking pin members 218 into a locking portion of the locking mechanism 108 of the filter element 100.

Figure 7A:
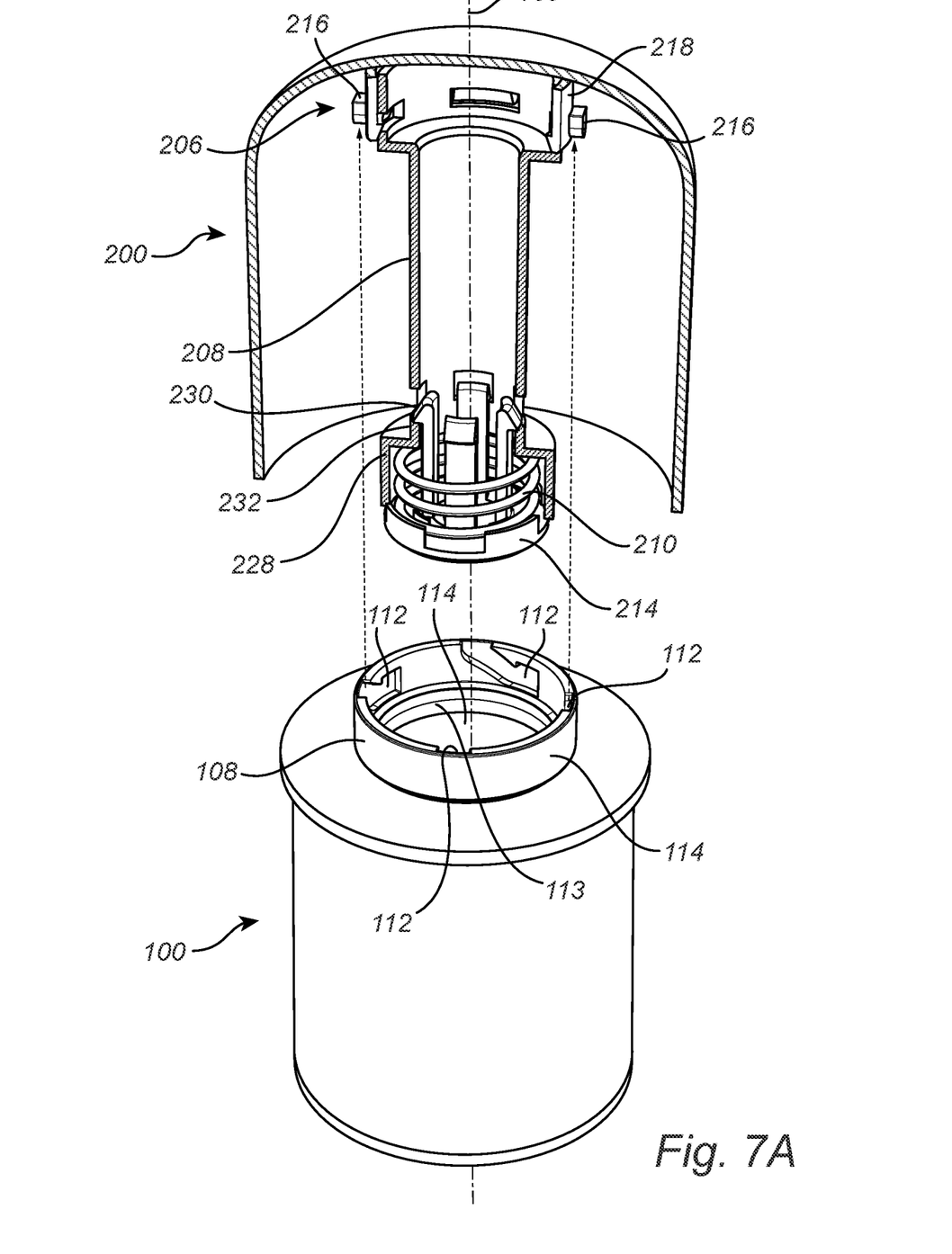
FIG. 7A illustrates a filter element and a filter housing according to embodiments of the invention, as the filter element is inserted into the filter housing.

FIG. 7A illustrates the filter element 100 in the process of being inserted into the filter housing 200. The locking mechanism 108 of the filter element 100 is arranged at one end of the filter element, i.e. at the bottom-end of the filter element such that it can reach the corresponding locking mechanism 206 at the bottom-end of the filter housing 200.

When the filter element 100 is inserted into the filter housing 200, the supporting member 208 holding the counter-force device, here shown as a bypass spring 210, is entered into the center hole 117 of the filter element 100. Thereby, the spring supporting member 208 and the bypass spring 210 is arranged surrounded by the filter medium.

The bypass spring 210 is supported on one side by a shoulder 228 of the spring supporting member 208. The bypass spring 210 is further arranged to apply a force onto a bypass valve gasket 214 in a direction parallel with the longitudinal axis 109. The bypass valve gasket 214 is maintained in position by latch members 230 engaging a respective edge 232. Thus, the latch members 230 engaged with the respective edge 232 can withstand the spring force from the bypass spring 210 such that the bypass valve gasket 214 and the spring remain in the intended positions in the filter housing 200.

The bypass spring 210 is preferably in a pretension state, i.e. the bypass spring 210 is compressed by the bypass valve gasket 214 against the shoulder 228 before the filter element 100 is locked in the filter housing 200.

Figure 7B:
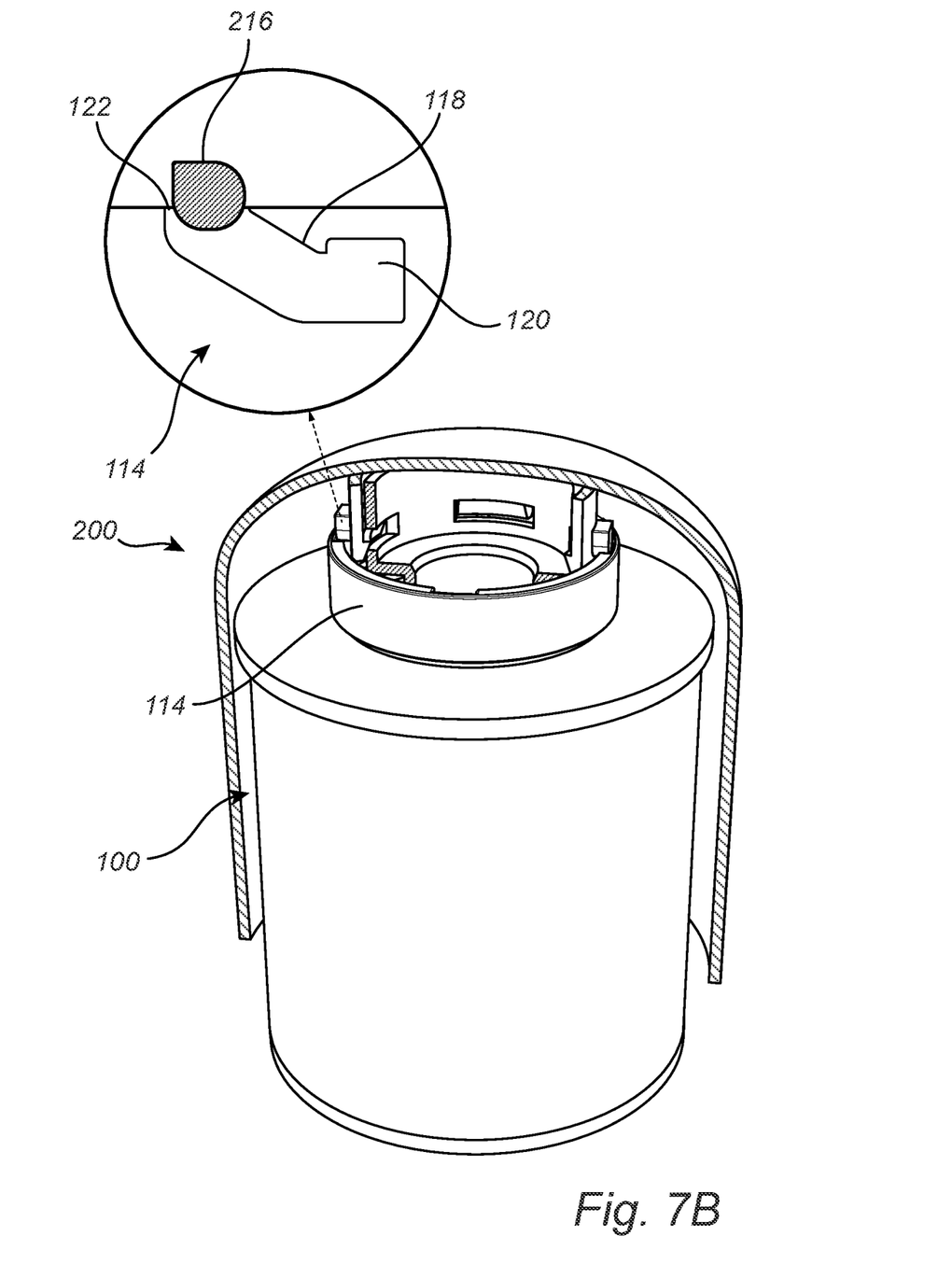
FIG. 7B illustrates a filter element and a filter housing according to embodiments of the invention, during a process of locking the filter element in the filter housing.

FIG. 7B illustrates the filter element 100 further in the process of being inserted into the filter housing 200.

The locking members of the filter element 100 may be grooves 118 in the circumferential flange 114 comprising a locking portion 120 configured to maintain a radial locking pin member 216 of the filter housing 200 in place. The grooves 118 are located on the inner circumference of the circumferential flange 114. The grooves 118 provide a simple yet robust way of securing the radial locking pin member 216 in place. In particular since the dimensions of the circumferential flange 114 is such that the circumferential locking mechanism of the filter housing just about fits in the inside the inner diameter of the circumferential flange 114, when the radial locking pin member 216 are arranged in the respective groove.

Each groove 118 comprises an inlet portion 122 configured to receive the radial locking pin member 216. In case the filter housing 200 and the filter element 100 comprises multiple radial locking pin members and grooves respectively, each of the radial locking pin members preferably enter the respective groove simultaneously.

Figure 7C:
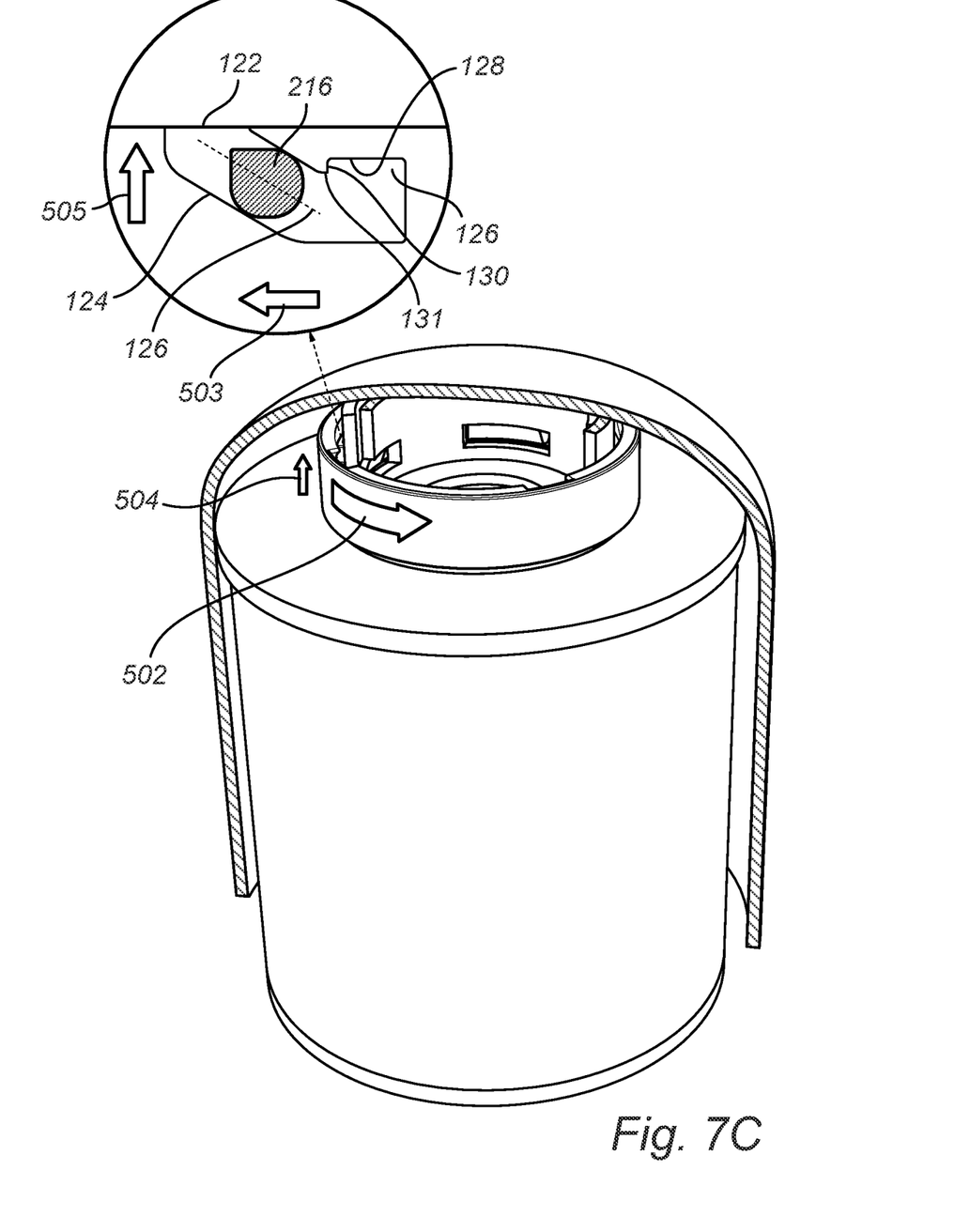
FIG. 7C illustrates a filter element and a filter housing according to embodiments of the invention, during a process of locking the filter element in the filter housing.

When the radial locking pin members 216 have entered the respective groove 118, and the filter element 100 is rotated with respect to the filter housing 200, the radial locking pin members 216 are guided by a guide portion 124 of the groove 118, as illustrated in FIG. 7C.

Accordingly, each groove 118 may comprise, in addition to the inlet portion 122, also a guide portion 124. A mentioned, the inlet portion 122 is configured to receive the radial locking pin member 216 of the filter housing 200. When the inlet portions 122 has received a respective radial locking pin member 216, it is possible to further push the filter housing and filter element together in the axial direction 109.

The guide portion 124 which is connected with the inlet 122 is configured to guide the radial locking pin member 216 along an at least partly circumferential path 126 when rotating the filter element with respect to the filter housing 200. The grooves 118 which are able to guide the radial locking pin member 216 provides for simplified operation for a user attempting to lock the filter element 100 in the filter housing 200.

Here, in the depicted example embodiment in FIGS. 7A-D, the guide portion 124 is shown as a straight groove segment. However, other configurations of the guide portion are conceivable, such as a curved guide portion.

In FIG. 7C, a rotational motion of the filter element 100 with respect to the filter housing 200 is indicated by arrows 502 and 503, and an axial motion of the filter element 100 with respect to the housing caused by an applied axial force for pushing the filter element 100 into the filter housing 200 is indicated by arrows 504 and 505.

Figure 7D:
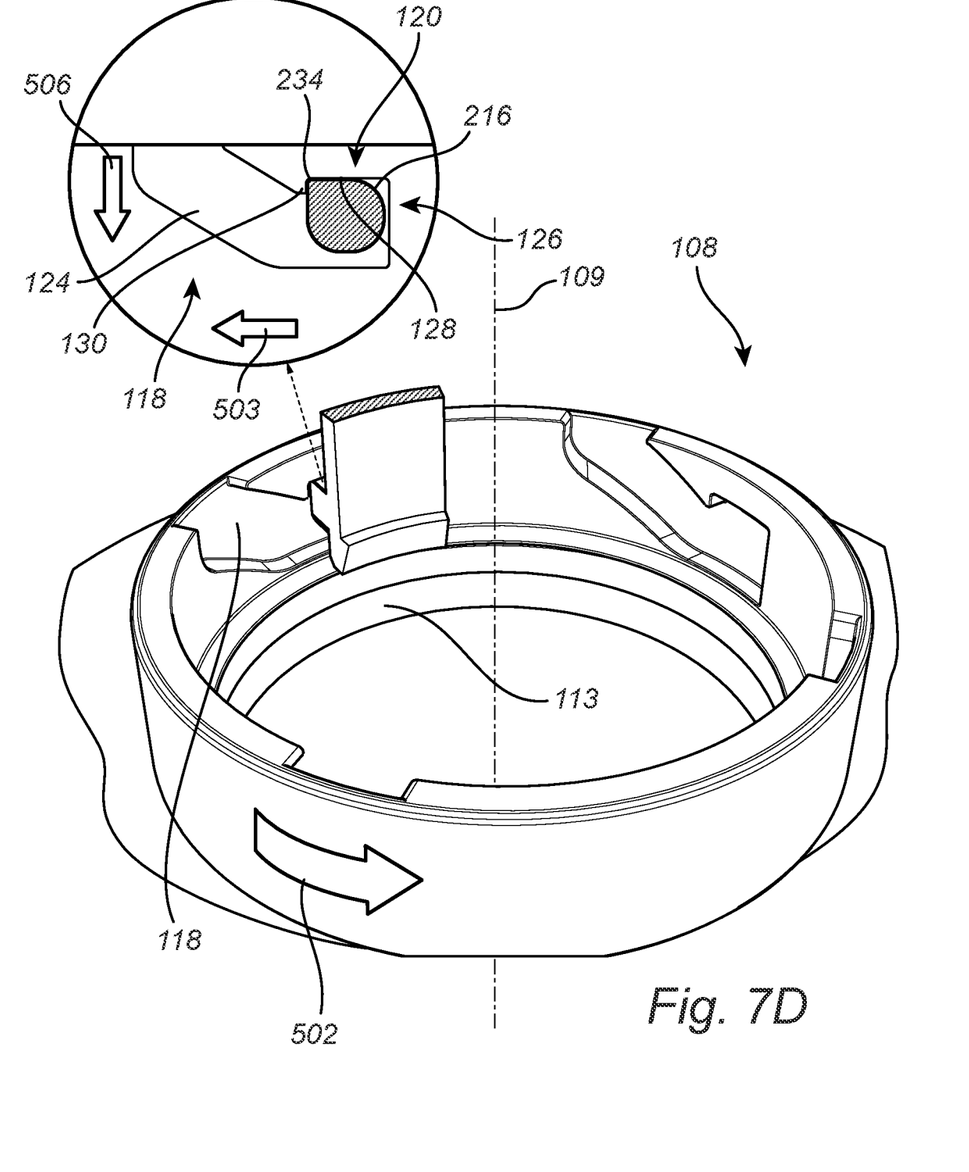
FIG. 7D illustrates a locking mechanism of a filter element locked to a locking mechanism of a filter housing according to embodiments of the invention.

In FIG. 7D is the radial pin locking member 216 rotated into a position where it is locked in position in the groove 118. In other words, in this position, the filter element 100 is latched into the locked position in the filter housing 200.

The radial pin locking member 216 is here locked in position in the locking portion 120 of the groove 118. The locking portion 120 of the groove 118 is configured to prevent to a counter rotation of the filter element 100 out of the locked position. Thereby, the filter element may advantageously be firmly locked in place in the filter housing 200. Thus, the locking portion 120 prevents the radial pin locking member 216 to travel back through the guide portion 124 without the input of an active force.

In order to further prevent the radial pin locking member 216 from leaving the locking portion 120 of the groove 118, the locking portion may comprise a pocket 127 (see also FIG. 7C) defined by a base plane 128 and a locking wall member 130 arranged adjacent to the guide portion 124. When the rotational motion of the filter element 100 with respect to the filter housing 200 results in that the radial locking pin member 216 is rotated past the locking wall member 130, the pocket 127 is configured to receive and lock the radial locking pin member 216 of the filter housing in place. Thereby, the filter element 100 may advantageously be firmly locked in place in the filter housing 200.

In other words, as the filter element 100 is rotated with respect to the filter housing 200, the radial pin locking member 216 travels in the guide portion 124 under the influence of an axial force along the axis 109 such that the bypass spring is compressed by the receiving surface of the filter element 100 pushing on the bypass valve gasket 214, see e.g. FIG. 7A.

When the radial pin locking member 216 has travelled past the locking wall member 130, the radial pin locking member 216 falls into the pocket 127 and makes contact with the base plane 128 under the influence of the counter-force. In other words, since the bypass spring, or any other counter-force device, applies the counter-force which attempts to force the filter element 100 out from the filter housing 200, the filter element 100 moves in an opposite direction as soon as the radial pin locking member 216 has travelled passed the locking wall member 130. Thus, the filter element is configured to move, under the influence of the counter-force, here exemplified by the bypass spring force, in the direction indicated by the arrow 506 as soon as the radial pin locking member 216 has travelled passed the locking wall member 130, whereby the radial pin locking member 216 is forced into the pocket 127.

Preferably, the height of the locking wall member 130 is larger than the length between adjacent turns of the threads 107 of the oil port 102 of the filter element 100. The length between adjacent turns is the pitch of the threads 107. The height of the locking wall member 130 is the height from the base plane 128 where the locking wall member 130 begins to the top shoulder 131 where the locking wall member 130 ends. In case the threads 107 misses the inlet of the corresponding threads 304, see FIG. 2A-B, the filter element will be pushed downwards relative the filter housing 200, further into the filter housing 200, whereby the radial pin locking member 216 will travel away from the base plane, but still under the influence of the counter-force which attempts to maintain the radial pin locking member 216 in contact with the base plane. With the above described relationship between the height of the locking wall member 130 and the pitch of the threads 107, the radial pin locking member 216 cannot be pushed out from the pocket before the threads 107 reaches the start of the threads again, or another one of the starts in case of a multi-start thread. This is because the radial pin locking member 216 will be pushed away from the base plane 128 no more than the size of the pitch of the threads. Having the height of the locking wall member 130 exceed the pitch of threads therefore ensures that the filter element 100 is locked in the filter housing 200 even if the threads 107 misses the threads 304 during the first turn. In case of a multi-start thread, the height of the locking wall member 130 is larger than the length between adjacent turns of the threads 107 of the oil port 102 of the filter element 100 divided by the number of starts. In other words, the height of the locking wall member 130 may be larger than the lead of the multi-start thread divided by the number of starts.

The radial pin locking member 216 may comprise a pointy end portion 234 configured to fit into the locking portion 120 of the groove 118 of the filter element 100 such that the radial pin locking member 216 is locked in place by the locking portion. The pointy end portion 234 of the radial pin locking member 216 is adapted to face the locking wall member 130 when locked in the locking portion 120.

The shape of the pointy end portion 234 may be configured to substantially match with an outline of the locking portion 120 of the groove 118 in the filter element 100. This advantageously provides for a firm locking position of the radial pin locking member 216 in the locking portion 120 of the groove 118.

For example, the angle of the pointy end portion may be about 90 degrees, whereby the angle between the locking wall portion 130 and the base plane 128 is about 90 degrees. Preferably, the angle between the locking wall portion 130 and the base plane 128 is about 90 degrees or less.

The cooperation of the locking mechanisms may be configured to provide a click-feedback when the filter element 100 is correctly latched into a locked position in the filter housing. Accordingly, when the filter element 100 is correctly locked in place in the filter housing, the cooperating locking mechanisms are configured to provide a click-feedback such that the user receives a confirmation the filter element 100 is correctly locked in the filter housing 200.

The click-feedback may depend on the magnitude of the counter-force and the height of the locking wall member 130. The click-feedback may be caused by the locking pin member falling onto the base plane under the influence of the counter-force, e.g. the spring force provided by the bypass spring 210.

Figure 8:
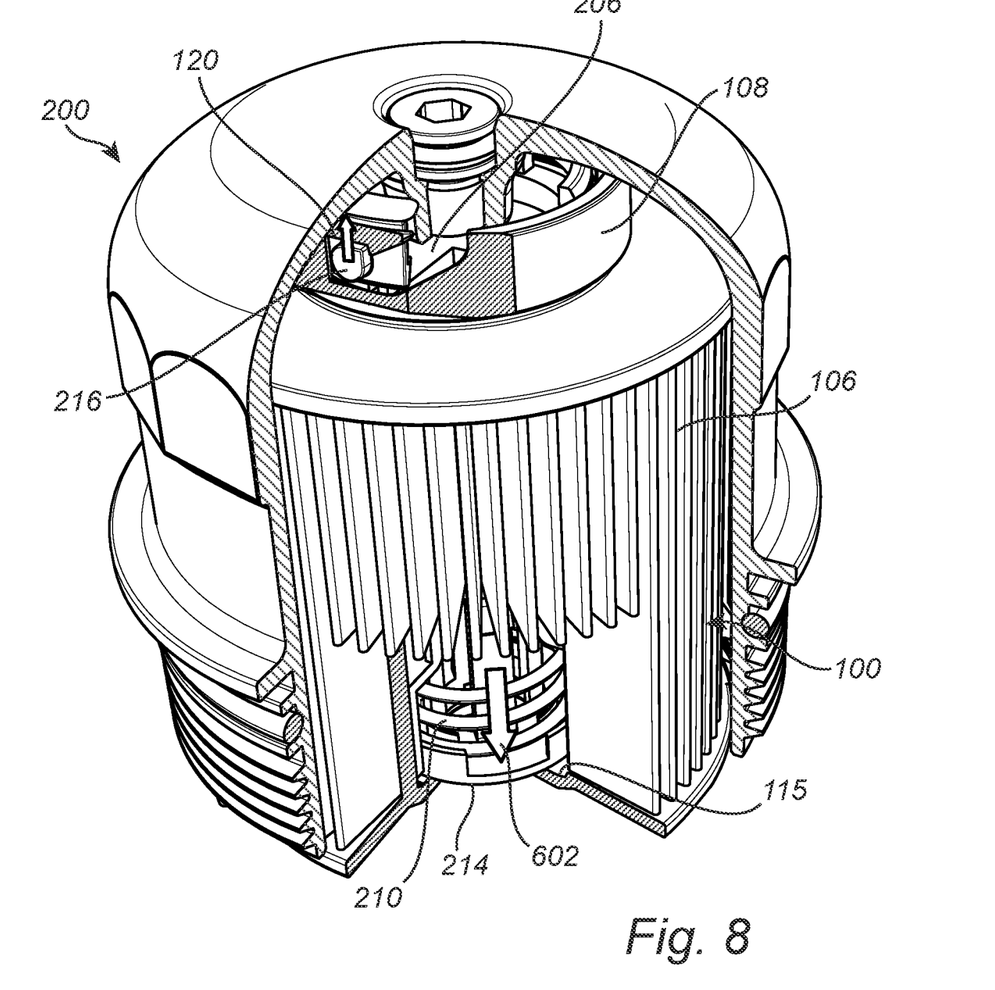
FIG. 8 illustrates a filter element locked in position with a filter housing.

FIG. 8 illustrates the filter element 100 latched in a locked position in the filter housing 200. As mentioned, the filter element 100 comprises a receiving surface 115 adapted for receiving a counter-force from the filter housing 200 when the axial force is applied for pushing the filter element 100 into the filter housing 200.

The distance between the receiving surface 115 and the locking mechanism 108 is such that without the axial force the locking mechanism of the filter element can not lock with the locking mechanism 206 of the filter housing 200. In this example, the radial pin locking member 126 is not able to reach the locking portion 120 without the axial force being applied.

When the axial force is applied, the counter-force device, i.e. the bypass valve spring 210, is configured to apply a counter-force indicated by arrow 602 to the receiving surface 115 of the filter element 100. When the bypass valve spring 210 is compressed, the radial pin locking member 126 is able to travel along the guide portion of the groove and reach the locking portion 120.

The radial pin locking member 126 is locked in the locking portion 120 under the influence of the counter-force provided by the bypass valve spring 210. The counter-force thus forces the radial pin locking member 126 into the locking portion 120 of the locking mechanism 108.

Furthermore, in case the counter-force device is a bypass valve spring 210, when the filter element 100 is locked in the filter housing 200, the bypass spring 210 is configured to push a bypass valve gasket 214 towards bypass through-holes in the filter element 100 such that the bypass through-holes 110, better seen in FIG. 1, are sealed. When the counter-force device is the bypass valve spring 210 pushing on the bypass valve gasket 214 towards bypass through-holes in the filter element 100, the threads 107 on the filter element oil port 102, shown in e.g. FIGS. 1 and 2A-B, are advantageous to ensure that the filter element 100 does not move axially when the bypass valve is opened, i.e. when the bypass valve gasket 214 releases its force on the receiving surface 115 of the upper plate 104 where the bypass through-holes 110 are located, to thereby allow for oil to unfiltered pass through the bypass through-holes 110. When the bypass valve gasket 214 releases its force on the receiving surface 115, a filter element 100 without threads 107 may move axially which may cause leakage from the engine oil port 102. Accordingly, the threads 107 further improves and facilitates the use of using the bypass valve spring 210 as the counter-force device.

A vehicle in accordance with the invention may be any vehicle operative on a road, such as a car, a truck, a lorry, a bus, etc.

Preferably, the locking mechanism of the filter element is one part of a bayonet coupling, and the matching locking mechanism of the filter housing is the other part of the bayonet coupling.

The locking mechanism of the filter element may be configured to cooperate with the filter housing locking mechanism to lock the filter element in place by a rotational motion of the filter element with respect to the filter housing while applying an axial force for pushing the filter element into the filter housing, wherein the filter element may comprise a receiving surface adapted for receiving a counter-force from the filter housing when the axial force is applied, wherein the distance between the receiving surface and the locking mechanism of the filter element is adapted such that the filter element is configured to latch into a locked position in the filter housing under the influence of the counter-force.

The filter housing according to may comprise a supporting element arranged to support a counter-force device at the distal end of the filter housing opposite from the bottom part, the counter-force device is configured to provide a counter-force on a receiving surface of the filter element to maintain the filter element in a locked position in the filter housing.

The filter housing locking mechanism may be configured to cooperate with a filter element locking mechanism to lock the filter element in place by a rotational motion of the filter element with respect to the filter housing while applying an axial force for pushing the filter element into the filter housing to thereby overcome the counter-force.

When the filter element is locked in the filter housing, the counter-force device may be configured to push a bypass valve gasket towards bypass through-holes in the filter element such that the bypass through-holes are sealed.

The counter-force device may be a bypass valve spring.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A filter housing for accommodating a filter element, the filter housing comprising:
   a side wall connected with a bottom part defining a housing volume configured to hold oil and to accommodate the filter element;
   a locking mechanism configured to releasably lock the filter element in place; and
   a thread at a distal end of the filter housing opposite the end at the bottom part, wherein the thread is adapted for attaching the filter housing to an engine, wherein the thread has substantially a same lead as threads of an oil port of the filter element;
   wherein the locking mechanism of the filter housing comprises at least one locking member configured to latch onto matching locking members of the filter element;
   wherein the at least one locking member comprises at least two locking members circumferentially arranged with respect to each other;
   wherein the locking members are equally circumferentially distributed on flanges extending in an axial direction from the bottom part.

2. The filter housing according to claim 1, further comprising:
   a supporting element arranged to supporting a counter-force device of the filter housing at a distal end of the filter housing opposite from the bottom part, wherein the counter-force device is configured to provide a counter-force on a receiving surface of the filter element to maintain the filter element in a locked position in the filter housing.

3. The filter housing according to claim 2, wherein the filter housing locking mechanism is configured to cooperate with a filter element locking mechanism to lock the filter element in place by a rotational motion of the filter element with respect to the filter housing while applying an axial force for pushing the filter element into the filter housing to thereby overcome the counter-force.

4. The filter housing according to claim 2, wherein the counter-force device pushes a bypass valve gasket of the filter housing towards bypass through-holes in the filter element such that the bypass through-holes are sealed.

5. The filter housing according to claim 2, wherein the counter-force device is a bypass valve spring.

6. The filter housing according to claim 3, wherein the locking mechanism of the filter housing comprises at least one radial pin locking member configured to be received in a groove of the locking mechanism of the filter element.

7. The filter housing according to claim 1, wherein the threads of the filter housing are for attaching the filter housing to a vehicle engine at an oil sump or in an engine block.

8. The filter housing according to claim 1, configured to be threaded into receiving threads of the engine at the same time as that the filter element oil port is threaded into the engine oil port.

9. The filter housing according to claim 8, the threads of the filter housing and the filter element oil port collectively adapted so that if the filter housing and the filter element are simultaneously screwed into the engine, they move axially at substantially the same pace.

10. The filter housing according to claim 1, wherein, when the filter housing has received the filter element and is about to be mounted in the engine, a distance between an uppermost portion of the threads of the filter housing and the uppermost portion of the threads on the oil port is smaller than the distance between an entry of the threads in the engine and an entry of the threads in the oil port of the engine.

11. The filter housing according to claim 10, wherein the distance between the uppermost portion of the threads of the filter housing and the uppermost portion of the threads on the oil port is smaller than the distance, between a second turn of the threads in the engine and the entry of the threads in the oil port.

12. The filter housing according to claim 1, further comprising a surface for receiving an O-ring to seal a connection between the engine and the filter housing.

* * * * *